Sept. 22, 1936.   L. J. LARSON   2,054,939

METHOD OF FABRICATING ALLOY LINED PRESSURE VESSELS

Filed May 25, 1936

INVENTOR.
Louis J. Larson
BY
ATTORNEY.

Patented Sept. 22, 1936

2,054,939

UNITED STATES PATENT OFFICE 2,054,939

METHOD OF FABRICATING ALLOY LINED PRESSURE VESSELS

Louis J. Larson, Milwaukee, Wis., assignor to A. O. Smith Corporation, Milwaukee, Wis., a corporation of New York Application May 25, 1936, Serial No. 81,595

3 Claims. (Cl. 219—10)

The invention relates to a method of fabricating alloy lined pressure vessels and has been applied more particularly in lined pressure vessels of the kind set forth in U. S. Letters Patents Nos. 1,680,276 and 1,840,305 issued to O. E. Andrus and Sune Hermanson.

In the application of a liner of the type disclosed in the above patents certain difficulties arise in welding the liner at the main seams of the vessel. With present standards of X-ray examination of the seams it has been found preferable to weld the carbon steel seams in the vessel wall proper prior to welding the liner seams. When this is done the liner sheets are usually spaced back from the edges of the carbon steel plates so as not to be injured from the welding of the plate seams. This leaves a fairly wide gap at the seam in the liner, which must be covered with alloy metal.

Where the walls of the vessel are thick it is necessary to heat the plates before rolling into rings for forming the vessel, and considerable difficulty has been experienced in subsequently depositing a satisfactory alloy weld metal over the seam. It has been suggested that perhaps this difficulty is due to an oxidation of the metal beneath the edges of the liner sheet, and again that it may be due to a slight buckling of the liner sheet after rolling, making an irregular space between it and the carbon steel plate at the edge of the liner sheet.

The object of the present invention is to provide a method of fabrication which will overcome this difficulty and will facilitate the making of satisfactory alloy deposits joining the edges of the liner sheets at the main seams in the vessel.

Other objects will appear hereinafter.

The preferred embodiment of the invention is illustrated in the accompanying drawing in which.

Figure 1:
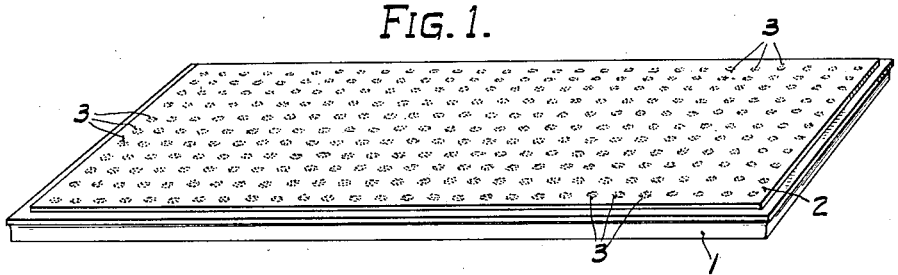
Figure 1 is a perspective view of a carbon steel plate having an alloy liner sheet secured thereto.
Figure 2:
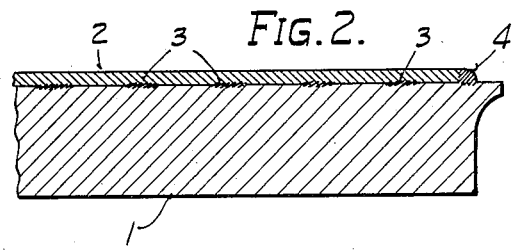
Fig. 2 is a broken transverse section taken at one edge of the plate and showing the next step in fabrication.

The plate 1, which is adapted to be rolled into a tubular ring is of plain carbon steel or other suitable load-bearing steel, a plurality of such plates being used in the fabrication of the main body and heads of a pressure vessel.

The liner 2 is of suitable alloy to resist corrosion in service and is welded to the inner surface of the plate 1 at a plurality of points such as the spot welds 3. The liner 2 does not extend to the edge of plate 1, but is set back from the edge sufficiently to prevent injury to the liner when a carbon steel weld is being made between the edges of two plates.

Prior to rolling the composite plate and liner, a seal pass 4 is made to deposit alloy weld metal continuously around the edges of the liner sheet 2. This seal pass is a light fillet weld and tends to prevent any tendency of the liner to warp at the edges during heating and rolling, and also to prevent any tendency of the metal to oxidize beneath the edges of the liner sheet. The seal weld 4 is preferably made by the metallic electric arc process although it may be made by other suitable processes.

The plate 1 and attached liner sheet 2 are heated and rolled to form a tubular ring, or spun or pressed to form the head for a pressure vessel. Where the plate 1 is not too thick it is possible to form it without heating.

Figure 3:
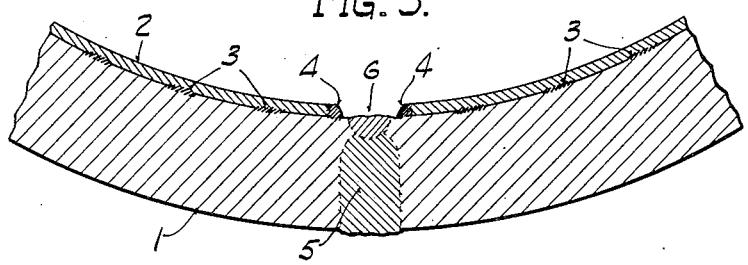
Fig. 3 is a transverse section through the longitudinal seam after the plate has been rolled and the carbon steel welded.
Figure 4:
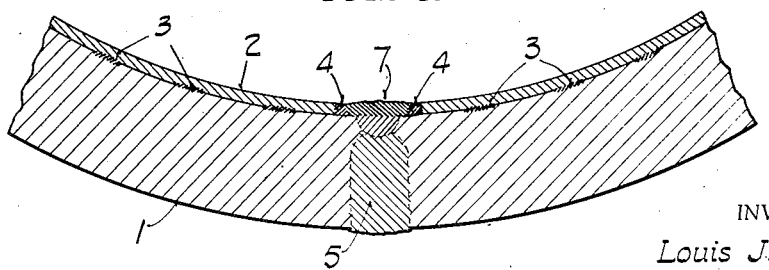
Fig. 4 is a view similar to Fig. 3 showing the completed weld.

After forming, the plate is welded at the longitudinal seam 5 provided by its end edges, or to another similar plate at a circumferential seam. Figures 3 and 4 show the welding of longitudinal straight seams in the vessel wall, it being understood that the procedure of welding circumferential seams between plates is substantially the same. The welding of the carbon steel plate 1 at 5 is done by the electric arc process using a metallic electrode and depositing weld metal in a suitable groove at the edges.

The carbon steel weld 5 and a portion of the plate 1 on each side of the weld are exposed between the two seal passes 4 at the edges of the liner sheet 2, and a groove 6 is formed between the seal passes 4 for receiving a deposit of alloy weld metal 7 to cover the carbon steel of the weld 5 and plate 1. The deposit of alloy metal 7 between the seal passes 4 is preferably made with an alloy electrode using the electric arc process. In making the deposit 7 it is preferable to make a single pass of the electrode along the groove 6, the deposit from the pass being fused with the seal welds 4 on the sides of the groove 6. The deposit 7 may be made with more than one pass of the electrode along the groove 6 where the latter is extremely wide or for other reasons it is found desirable to use more than one pass. As many layers of alloy deposit may be used as becomes advisable in the particular case, having regard to the thickness of the liner sheet 2 and the character of the alloy lining and of the service to which the vessel will be subjected. Usually one or two layers of deposit are satisfactory.

One of the advantages of the continuous deposit 7 fused with the weld metal 5 and adjacent plate 1 lies in the later inspection of the vessel in service. Sometimes too severe operating conditions or other factors tend to cause cracks in the carbon steel weld or adjacent plate stock. These cracks immediately show up at the surface of the alloy deposit and warn the operator.

The invention may have various modifications within the scope of the accompanying claims.

I claim:

1. The method of fabricating alloy lined pressure vessels, which comprises attaching liner sheets of suitable alloy metal to steel plates with the edges of the liner sheets set back from the edges of the plates, depositing an alloy seal weld around the edges of the liner sheets, forming the plates and attached liner sheets into complementary curved parts of the vessel, welding the plates at their meeting edges with metal of the composition of the plates, and thereafter welding the edges of the liner sheets together by depositing fused weld metal therebetween of substantially the same composition as that of the liner sheets.

2. The method of fabricating alloy lined pressure vessels, which comprises attaching liner sheets of suitable alloy metal to complementary parts for making the vessel with the edges of the liner sheets set back from the edges of the parts, depositing an alloy seal weld along the edges of the liner sheets, welding the parts together at their meeting edges, and thereafter depositing alloy weld metal over the seams and between the liner sheets to provide a continuous alloy lining for the vessel.

3. The method of fabricating alloy lined vessels, which comprises attaching liner sheets of suitable alloy metal to complementary parts for making the vessel with the edges of the liner sheets set back from the edges of the parts, the attachment of said liner sheets including seal welds along the edges of the liner sheets, welding the parts together at their meeting edges, and thereafter covering the seams between the liner sheets to provide a continuous alloy lining for the vessel.

LOUIS J. LARSON.